(12) United States Patent
Chung et al.

(10) Patent No.: US 11,188,169 B2
(45) Date of Patent: Nov. 30, 2021

(54) TOUCH DISPLAY PANEL AND TOUCH DISPLAY DEVICE WITH SWITCHABLE VIEWING ANGLES

(71) Applicant: Infovision Optoelectronics (Kunshan) Co., LTD., KunShan (CN)

(72) Inventors: Te-Chen Chung, Kunshan (CN); Chia-Te Liao, Kunshan (CN); Yuying He, Kunshan (CN); Erlong Qi, Kunshan (CN)

(73) Assignee: INFOVISION OPTOELECTRONICS (KUNSHAN) CO., LTD., Kunshan (CN)

( * ) Notice: Subject to any disclaimer, the term of this patent is extended or adjusted under 35 U.S.C. 154(b) by 95 days.

(21) Appl. No.: 16/613,788

(22) PCT Filed: May 24, 2017

(86) PCT No.: PCT/CN2017/085796
§ 371 (c)(1),
(2) Date: Nov. 14, 2019

(87) PCT Pub. No.: WO2018/214080
PCT Pub. Date: Nov. 29, 2018

(65) Prior Publication Data
US 2021/0149511 A1 May 20, 2021

(51) Int. Cl.
*G06F 3/044* (2006.01)
*G06F 3/041* (2006.01)
(Continued)

(52) U.S. Cl.
CPC .......... *G06F 3/0416* (2013.01); *G02F 1/1323* (2013.01); *G02F 1/134309* (2013.01);
(Continued)

(58) Field of Classification Search
CPC .... G06F 3/0412; G06F 3/0443; G06F 3/0446; G06F 3/04166; G02F 1/136222;
(Continued)

(56) References Cited

U.S. PATENT DOCUMENTS

2015/0177880 A1* 6/2015 Shin ...................... G06F 3/0446
345/174
2016/0341987 A1* 11/2016 Chung .............. G02F 1/134363
(Continued)

FOREIGN PATENT DOCUMENTS

CN         103135815 A    6/2013
CN         103838044 A    6/2014
(Continued)

*Primary Examiner* — Abdul-Samad A Adediran
(74) *Attorney, Agent, or Firm* — Cheng-Ju Chiang

(57) ABSTRACT

A touch display panel with switchable viewing angles includes a first substrate, a second substrate, and a liquid crystal layer between the first substrate and the second substrate. The first substrate is provided with a viewing angle control electrode. The second substrate is provided with a common electrode and a sensing circuit layer. The common electrode includes a plurality of electrode blocks arranged in an array and insulated from each other. The sensing circuit layer includes a plurality of sensing lines insulated from each other. The sensing lines are electrically connected to the electrode blocks in a one-to-one correspondence, respectively. Each frame of the display panel is divided into a display period and a touch period. The electrode blocks of the common electrode are used for image display during the display period, and the electrode blocks of the common electrode are used for touch sensing during the touch period.

17 Claims, 11 Drawing Sheets

(51) Int. Cl.
   *G02F 1/1362* (2006.01)
   *G02F 1/13* (2006.01)
   *G02F 1/1343* (2006.01)

(52) U.S. Cl.
   CPC .. *G02F 1/136222* (2021.01); *G02F 1/136286* (2013.01); *G06F 3/0412* (2013.01); *G06F 3/0443* (2019.05)

(58) Field of Classification Search
   CPC ............ G02F 1/1323; G02F 1/134309; G02F 1/136286; G02F 1/134363
   USPC ........................................................ 345/174
   See application file for complete search history.

(56) References Cited

U.S. PATENT DOCUMENTS

| | | | | |
|---|---|---|---|---|
| 2017/0262121 | A1* | 9/2017 | Kurasawa | G06F 3/0443 |
| 2017/0344787 | A1* | 11/2017 | Cho | G06F 3/04166 |
| 2018/0081472 | A1* | 3/2018 | Xi | G06F 3/0443 |

FOREIGN PATENT DOCUMENTS

| | | | |
|---|---|---|---|
| CN | 105183251 | A | 12/2015 |
| CN | 105652532 | A | 6/2016 |
| CN | 205301759 | U | 6/2016 |
| CN | 105759485 | A | 7/2016 |
| CN | 106094289 | A | 11/2016 |
| CN | 106444104 | A | 2/2017 |
| CN | 106501982 | A | 3/2017 |
| CN | 106681044 | A | 5/2017 |
| JP | 2005-338476 | A | 12/2005 |

* cited by examiner

TOUCH DISPLAY PANEL AND TOUCH DISPLAY DEVICE WITH SWITCHABLE VIEWING ANGLES

CROSS REFERENCE TO RELATED APPLICATIONS

This application is a 35 U.S.C. § 371 National Phase conversion of International (PCT) Patent Application No. PCT/CN2017/085796, filed on May 24, 2017. The contents of the above-identified applications are incorporated herein by reference. The PCT International Patent Application was filed and published in Chinese.

TECHNICAL FIELD

The present invention relates to the field of display technologies, and more particularly to a touch display panel and a touch display device with switchable viewing angles.

BACKGROUND OF THE INVENTION

Liquid crystal display panel (LCD) has the advantages of good image quality, small size, light weight, low driving voltage, low power consumption, no radiation and relatively low manufacturing cost, and is dominant in the field of flat panel display. The liquid crystal display panel includes a color filter substrate and a thin film transistor array substrate which are disposed oppositely, and a liquid crystal layer interposed therebetween.

Currently, the liquid crystal display panels are gradually developing towards wide viewing angles. For example, a liquid crystal display panel adopting a fringe field switching mode (FFS) can realize a wide viewing angle. However, people are paying more and more attention to the protection of their privacy. There are many things that do not like to share with others. In public places, people want to keep their contents confidential when they use a mobile phone or browse a computer. Therefore, the display device with a single viewing angle mode has been unable to meet the needs of the users. In addition to the need for a wide viewing angle mode, it is also desirable to be able to switch or adjust the display device to a narrow viewing angle mode when the privacy protection is required.

In order to switch between wide and narrow viewing angles of the liquid crystal display panel, one way is to apply a vertical electric field to the liquid crystal molecules by using a viewing angle control electrode provided on the side of the color filter substrate, so as to switch between the wide viewing angle and the narrow viewing angle by changing the tilt angle of the liquid crystal molecules. Referring to FIG. 1 and FIG. 2, the liquid crystal display panel includes a first substrate 51, a second substrate 52, and a liquid crystal layer 53 between the first substrate 51 and the second substrate 52. The first substrate 51 is provided with a viewing angle control electrode 511.

As shown in FIG. 1, when a wide viewing angle mode is required, the viewing angle control electrode 511 on the first substrate 51 is not applied with a voltage, and the liquid crystal display panel realizes a wide viewing angle mode.

As shown in FIG. 2, when a narrow viewing angle mode is required, the viewing angle control electrode 511 on the first substrate 51 is applied with a voltage, such that a vertical electric field E is generated between the first substrate 51 and the second substrate 52 (as indicated by the arrows in the figure). The liquid crystal molecules in the liquid crystal layer 53 are tilted under the action of the vertical electric field E, and a light leakage phenomenon occurs in the liquid crystal display panel, so that the contrast of the screen is lowered, and finally a narrow viewing angle mode is realized.

With the rapid development of the display technology, touch panels have been widely used in people's daily lives. Currently, the touch panel can be divided into on-cell touch panel and in-cell touch panel according to the structure. The in-cell touch panel embeds the touch sensors of the touch panel inside the LCD screen. Therefore, it is necessary to provide a touch display panel with a switchable viewing angle, and can realize touch sensing while achieving the switching between wide and narrow viewing angles.

SUMMARY OF THE INVENTION

In view of the above, the object of the present invention is to provide a touch display panel with switchable viewing angles, which combines the function of switching between wide and narrow viewing angles and the function of in-cell touch, and can realize touch sensing while achieving the switching between wide and narrow viewing angles.

An embodiment of the present invention provides a touch display panel with switchable viewing angles, including a first substrate, a second substrate disposed opposite to the first substrate, and a liquid crystal layer disposed between the first substrate and the second substrate. The first substrate is provided with a viewing angle control electrode. The second substrate is provided with scanning lines, data lines, a common electrode and pixel electrodes. A plurality of scanning lines and a plurality of data lines are insulated from and intersected with each other to define a plurality of sub-pixels. The pixel electrode is disposed in each of the sub-pixels. The common electrode includes a plurality of electrode blocks arranged in an array and insulated from each other. The second substrate is further provided with a sensing circuit layer. The sensing circuit layer includes a plurality of sensing lines insulated from each other. The sensing lines are electrically connected to the electrode blocks in a one-to-one correspondence, respectively. Each frame of the display panel is divided into a display period and a touch period. The electrode blocks of the common electrode are used for image display during the display period, and the electrode blocks of the common electrode are used for touch sensing during the touch period.

Further, the viewing angle control electrode is defined with a perforation in each of the sub-pixels.

Further, the position of the perforation corresponds to a middle of each of the sub-pixels.

Further, the first substrate further includes a color filter layer, a black matrix and a metal conductive layer. The metal conductive layer includes a plurality of metal conductive strips. The metal conductive strips are aligned and overlapped with the black matrix. The metal conductive strips are electrically connected to the viewing angle control electrode.

Further, the first substrate further includes a first overcoat layer and a second overcoat layer. The color filter layer and the black matrix are formed on a surface of the first substrate facing the liquid crystal layer. The first overcoat layer covers the color filter layer and the black matrix. The viewing angle control electrode is formed on the first overcoat layer. The metal conductive layer is formed on the viewing angle control electrode. The second overcoat layer covers the metal conductive layer.

Further, the first substrate further includes a color filter layer and a metal conductive layer. The metal conductive layer includes a plurality of metal conductive strips. The metal conductive strips are intersected with each other to form a mesh structure and also serve as a black matrix. The metal conductive strips are electrically connected to the viewing angle control electrode.

Further, the first substrate further includes an overcoat layer. The color filter layer and the metal conductive layer are formed on a surface of the first substrate facing the liquid crystal layer. The viewing angle control electrode covers the color filter layer and the metal conductive layer. The overcoat layer covers the viewing angle control electrode.

Further, each electrode block of the common electrode corresponds to one or multiple sub-pixels.

Further, the second substrate further includes a plurality of thin film transistors. The thin film transistors are covered by a first passivation layer. The sensing circuit layer and the common electrode are disposed above the first passivation layer. A second passivation layer is disposed between the sensing circuit layer and the common electrode. The second passivation layer is defined with a contacting hole at a position corresponding to each of the electrode blocks of the common electrode. One end of each sensing line of the sensing circuit layer is electrically connected to a corresponding electrode block of the common electrode through a contacting hole, and the other end of each sensing line of the sensing circuit layer is electrically connected to a touch-integrated driver IC.

Further, the second substrate further includes an overcoat layer. The overcoat layer is formed on the first passivation layer. The sensing circuit layer is formed on the overcoat layer. The second passivation layer covers the sensing circuit layer.

Further, the pixel electrode is located above the common electrode, and a third passivation layer is provided between the pixel electrode and the common electrode.

Further, each electrode block of the common electrode is applied with a direct current voltage during the display period, and each electrode block of the common electrode is applied with a touch sensing signal during the touch period.

Further, during the display period, when a voltage difference between the viewing angle control electrode and the common electrode is less than a predetermined value, the touch display panel is in a first viewing angle mode, and when a voltage difference between the viewing angle control electrode and the common electrode is greater than a predetermined value, the touch display panel is in a second viewing angle mode.

Further, when the touch display panel is in the first viewing angle mode, the viewing angle control electrode is applied with a direct current voltage during the display period, and when the touch display panel is in the second viewing angle mode, the viewing angle control electrode is applied with an alternating voltage during the display period.

Further, the liquid crystal layer employs positive liquid crystal molecules, the first viewing angle mode is a wide viewing angle mode, and the second viewing angle mode is a narrow viewing angle mode.

Further, the liquid crystal layer employs negative liquid crystal molecules, the first viewing angle mode is a narrow viewing angle mode, and the second viewing angle mode is a wide viewing angle mode.

An embodiment of the present invention further provides a touch display device with switchable viewing angle, including:

the above-described viewing angle switchable touch display panel;

a touch-integrated driver IC configured to drive the touch display panel, to realize image display during the display period and realize touch sensing during the touch period.

Further, the touch display device is provided with a viewing angle switching button for the user to issue a viewing angle switching request to the touch display device.

For the touch display panel and the touch display device with switchable viewing angles provided by the embodiments of the present invention, the common electrode adopts a time multiplexing manner, so that the image display and the touch sensing are alternately performed. By controlling the voltage applied to the viewing angle control electrode, the touch display panel can be freely switched between the wide viewing angle mode and the narrow viewing angle mode, with the function of switching between wide and narrow viewing angles and the function of in-cell touch being combined to realize touch sensing while achieving the switching between wide and narrow viewing angles. Furthermore, it also simplifies the production process, reduces the production cost, and reduces the module thickness.

DETAILED DESCRIPTION OF PREFERRED EMBODIMENTS

In order to make the objects, technical solutions and advantages of the present invention much clear, embodiments of the present invention will be further described with reference to the accompanying drawings.

First Embodiment

Figure 1:
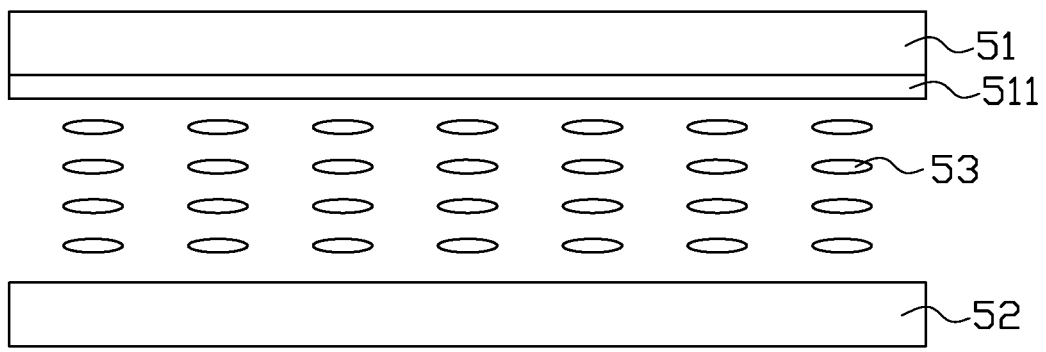
FIG. 1 is a schematic view of a related liquid crystal display panel in a wide viewing angle mode.
Figure 2:
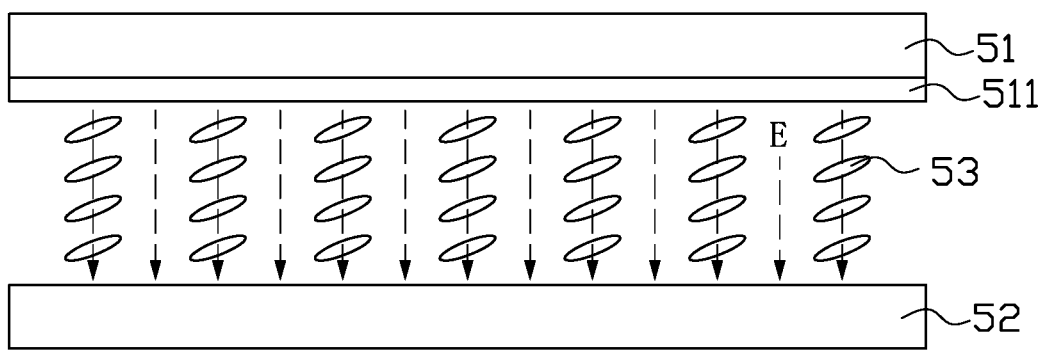
FIG. 2 is a schematic view of the liquid crystal display panel of FIG. 1 in a narrow viewing angle mode.
Figure 3:
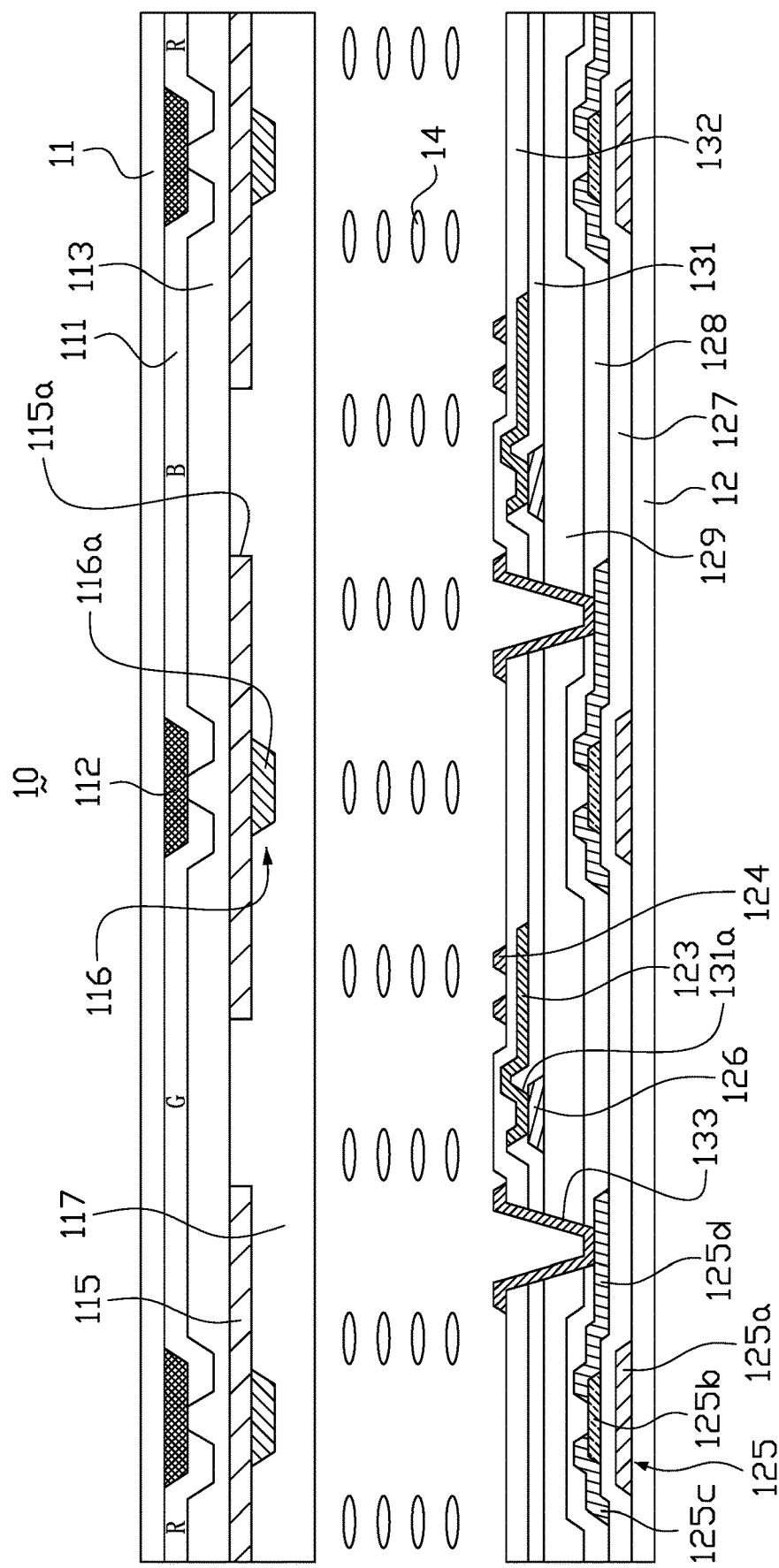
FIG. 3 is a schematic view of a touch display panel in a wide viewing angle mode according to a first embodiment of the present invention.

FIG. 3 is a schematic view of a touch display panel in a wide viewing angle mode according to a first embodiment of the present invention. Referring to FIG. 3, the touch display panel 10 includes a first substrate 11, a second substrate 12 disposed opposite to the first substrate 11, and a liquid crystal layer 14 disposed between the first substrate 11 and the second substrate 12. The first substrate 11 may be a color filter substrate, and the second substrate 12 may be a thin film transistor array substrate.

In this embodiment, the first substrate 11 is provided with a color filter layer 111, a black matrix (BM) 112, a first overcoat layer 113, a viewing angle control electrode 115, a metal conductive layer 116 and a second overcoat layer 117. The color filter layer 111 includes, for example, color resist materials of three colors of red (R), green (G) and blue (B). The color filter layer 111 and the black matrix 112 are mutually staggered and formed on the surface of the first substrate 11 facing the liquid crystal layer 14. The first overcoat layer 113 covers the color filter layer 111 and the black matrix 112. The viewing angle control electrode 115 is formed on the first overcoat layer 113. The metal conductive layer 116 is formed on the viewing angle control electrode 115 and electrically connected to the viewing angle control electrode 115. The metal conductive layer 116 is aligned and overlapped with the black matrix 112. The second overcoat layer 117 covers the viewing angle control electrode 115 and the metal conductive layer 116.

Figure 4:
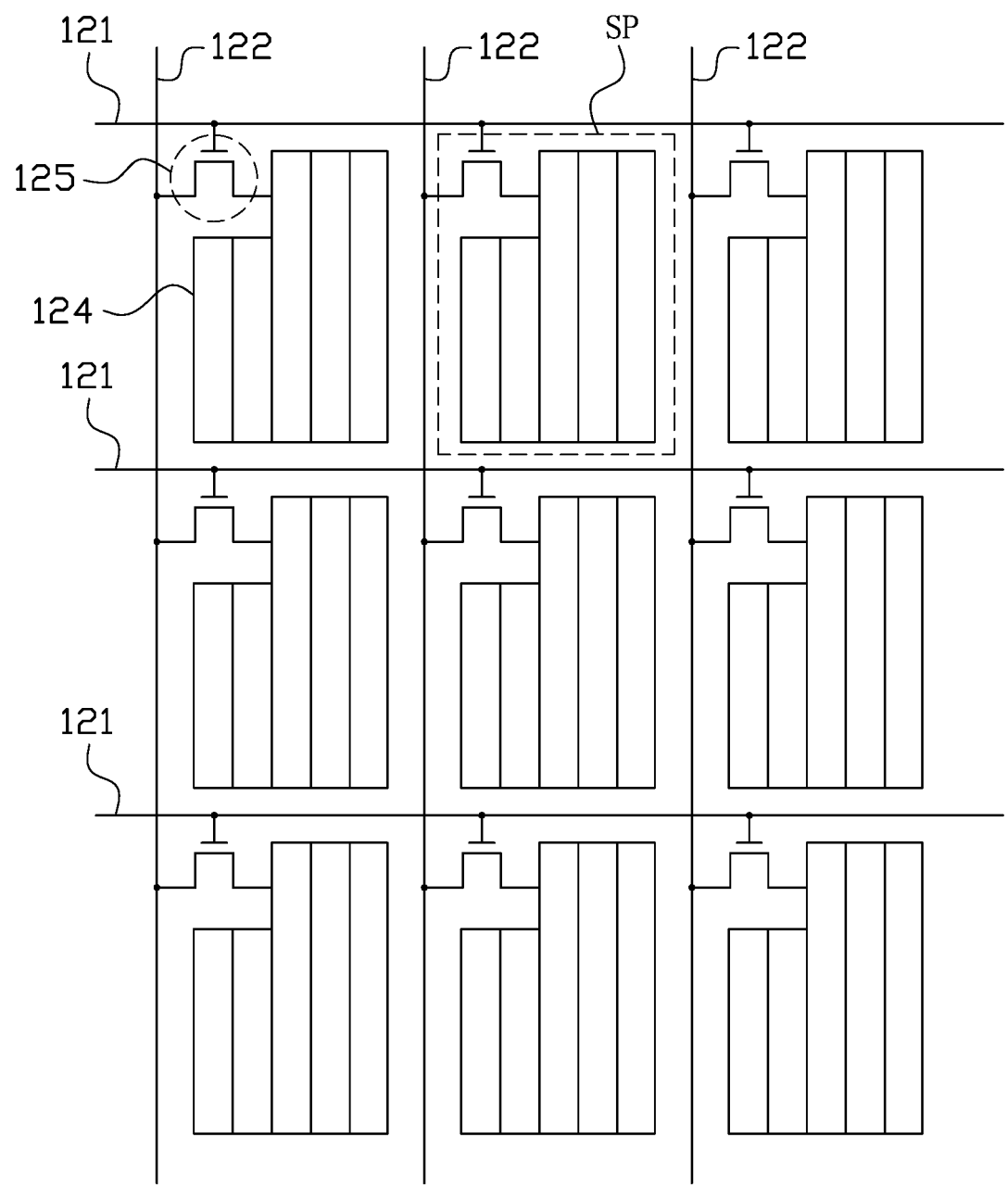
FIG. 4 is a circuit diagram of the second substrate of the touch display panel of FIG. 3.

FIG. 4 is a circuit diagram of the second substrate of the touch display panel of FIG. 3. Referring to FIG. 3 and FIG. 4, in this embodiment, the second substrate 12 is provided with scanning lines 121, data lines 122, a common electrode 123 and pixel electrodes 124, wherein a plurality of scanning lines 121 and a plurality of data lines 122 are insulated from and intersected with each other to define a plurality of sub-pixels SP arranged in an array. The pixel electrode 124 is disposed in each of the sub-pixels SP, and each of the sub-pixels SP is further provided with a thin film transistor (TFT) 125. The thin film transistor 125 is located near the intersection of the scanning line 121 and the data line 122. Each thin film transistor 125 includes a gate electrode 125a, an active layer 125b, a source electrode 125c and a drain electrode 125d. The gate electrode 125a is electrically connected to a corresponding scanning line 121, the source electrode 125c is electrically connected to a corresponding data line 122, and the drain electrode 125d is electrically connected to a corresponding pixel electrode 124.

In this embodiment, the touch display panel 10 is a display panel using fringe field switching (FFS) mode, and the common electrode 123 and the pixel electrode 124 are formed on the same substrate (i.e., the second substrate 12). When an electric field is applied between the common electrode 123 and the pixel electrode 124, the liquid crystal molecules are rotated in a plane substantially parallel to the substrates 11, 12 to obtain a wide viewing angle.

In this embodiment, the second substrate 12 is further provided with a sensing circuit layer 126, a gate insulating layer 127, a first passivation layer 128, a third overcoat layer 129, a second passivation layer 131 and a third passivation layer 132. The gate electrode 125a of the thin film transistor 125 is formed on the surface of the second substrate 12 facing the liquid crystal layer 14. The gate insulating layer 127 covers the gate electrode 125a of the thin film transistor 125. The active layer 125b, the source electrode 125c and the drain electrode 125d of the thin film transistor 125 are formed on the gate insulating layer 127. The first passivation layer 128 covers the active layer 125b, the source electrode 125c and the drain electrode 125d of the thin film transistor 125. The third overcoat layer 129 is formed on the first passivation layer 128. The sensing circuit layer 126 is formed on the third overcoat layer 129. The second passivation layer 131 covers the sensing circuit layer 126. The common electrode 123 is formed on the second passivation layer 131. The third passivation layer 132 covers the common electrode 123. The pixel electrode 124 is formed on the third passivation layer 132. A through hole 133 is defined through the third passivation layer 132, the second passivation layer 131, the third overcoat layer 129 and the first passivation layer 128, and the pixel electrode 124 is filled in the through hole 133 and electrically connected to the drain electrode 125d of the thin film transistor 125.

Figure 5:
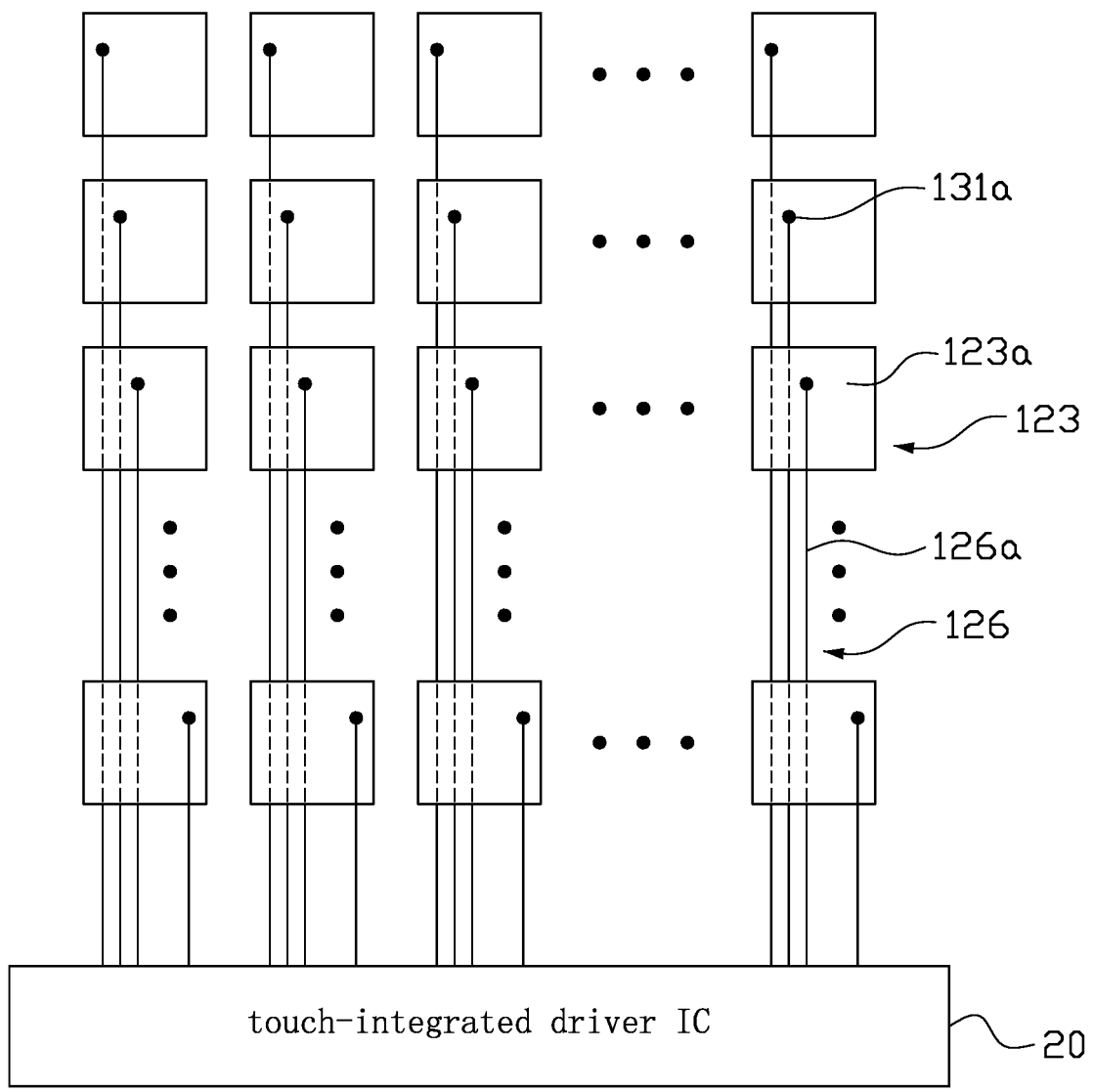
FIG. 5 is a schematic planar view of the sensing circuit layer and the common electrode of FIG. 3.

FIG. 5 is a schematic planar view of the sensing circuit layer and the common electrode of FIG. 3. Referring to FIG. 3 and FIG. 5, the common electrode 123 includes a plurality of electrode blocks 123a arranged in an array and insulated from each other. Each electrode block 123a corresponds to one or multiple sub-pixels SP. Preferably, each electrode block 123a corresponds to multiple sub-pixels SP. The sensing circuit layer 126 includes a plurality of sensing lines 126a insulated from each other. The sensing lines 126a are electrically connected to the electrode blocks 123a in a one-to-one correspondence, respectively. Specifically, the second passivation layer 131 is defined with a contacting hole 131a at a position corresponding to each of the electrode blocks 123a, wherein one end of each of the sensing lines 126a is electrically connected to a corresponding electrode block 123a of the common electrode 123 via the contacting hole 131a, and the other end of each of the sensing lines 126a is electrically connected to the touch-integrated driver IC 20.

In this embodiment, the sensing circuit layer 126 and the common electrode 123 form in-cell touch sensors in the second substrate 12. The in-cell touch sensor is a self-capacitive structure, and each electrode block 123a of the common electrode 123 serves as a self-capacitive electrode. The sensing line 126a in the sensing circuit layer 126 serves as a trace to lead the detection signal to the touch-integrated driver IC 20, and the detection signals are ultimately processed by the touch-integrated driver IC 20.

Figure 6:
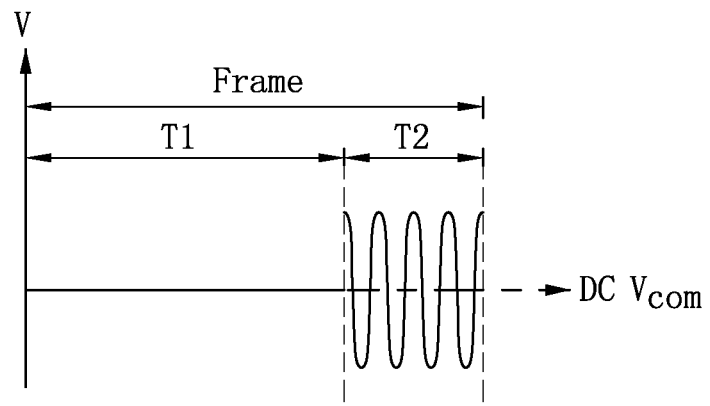
FIG. 6 is a schematic diagram of a waveform applied to the common electrode of FIG. 3.

FIG. 6 is a schematic diagram of a waveform applied to the common electrode of FIG. 3. Referring to FIG. 6, each frame of the touch display panel 10 is divided into a display period T1 and a touch period T2. In the display period T1, the electrode blocks 123a of the common electrode 123 are used for image display, and an electric field is formed between the common electrode 123 and the pixel electrode 124 to drive the liquid crystal molecules in the liquid crystal layer 14. In the touch period T2, the electrode blocks 123a of the common electrode 123 are used for touch sensing, to sense the touch operations on the screen. That is, the common electrode 123 works in a time multiplexing manner. On the one hand, the common electrode 123 is used to drive the liquid crystal molecules for image display during the display period T1, and on the other hand, the common electrode 123 is used to realize touch detection during the touch period T2.

Specifically, in the display period T1, each electrode block 123a of the common electrode 123 is applied with a common voltage (Vcom), so that an electric field for driving the liquid crystal molecules is formed between the common electrode 123 and the pixel electrode 124. In this embodiment, during the display period T1, the common voltage applied to the common electrode 123 is a direct current common voltage (i.e., DC Vcom).

Referring to FIG. 3, in this embodiment, the liquid crystal molecules in the liquid crystal layer 14 are positive liquid crystal molecules, and the positive liquid crystal molecules have the advantage of fast response. In the initial state (i.e., no voltage is applied to the display panel), the positive liquid crystal molecules in the liquid crystal layer 14 assume a lying posture substantially parallel to the substrates 11, 12, and the long-axis direction of the positive liquid crystal molecules is substantially parallel to the surfaces of the substrates 11, 12. However, in practical applications, the positive liquid crystal molecules in the liquid crystal layer 14 may have a small initial pretilt angle with respect to the substrates 11, 12, and the initial pretilt angle may be less than or equal to 10 degrees, namely, $0°\leq\theta\leq10°$.

The viewing angle control electrode 115 on the first substrate 11 is used to control the touch display panel 10 to switch between a wide viewing angle and narrow viewing angle. By applying different voltages on the viewing angle control electrode 115, the touch display panel 10 can switch between a wide viewing angle mode and a narrow viewing angle mode.

Referring to FIG. 3, during the display period T1, when the voltage difference between the voltage applied to the viewing angle control electrode 115 and the direct current common voltage (DC Vcom) applied to the common electrode 123 is less than a predetermined value (e.g., the voltage difference is less than 1V), the tilt angle of the liquid crystal molecules in the liquid crystal layer 14 is almost unchanged and remains in the lying posture due to a small bias voltage between the viewing angle control electrode 115 and the common electrode 123. In display, an in-plane electric field is formed between the pixel electrode 124 and the common electrode 123 on the same substrate (i.e., the second substrate 12) for driving the liquid crystal molecules to rotate in a plane parallel to the substrates 11, 12. The liquid crystal molecules achieve a wide viewing angle display under the action of a strong in-plane electric field, causing the touch display panel 10 to be in a wide viewing angle mode.

In the wide viewing angle mode, the voltage applied to the viewing angle control electrode 115 during the display period T1 is preferably a direct current voltage, and the direct current voltage is preferably equal to the direct current common voltage (DC Vcom) applied to the common electrode 123, such that the voltage difference between the viewing angle control electrode 115 and the common electrode 123 is zero, to thereby realize the wide viewing angle display.

Figure 7:
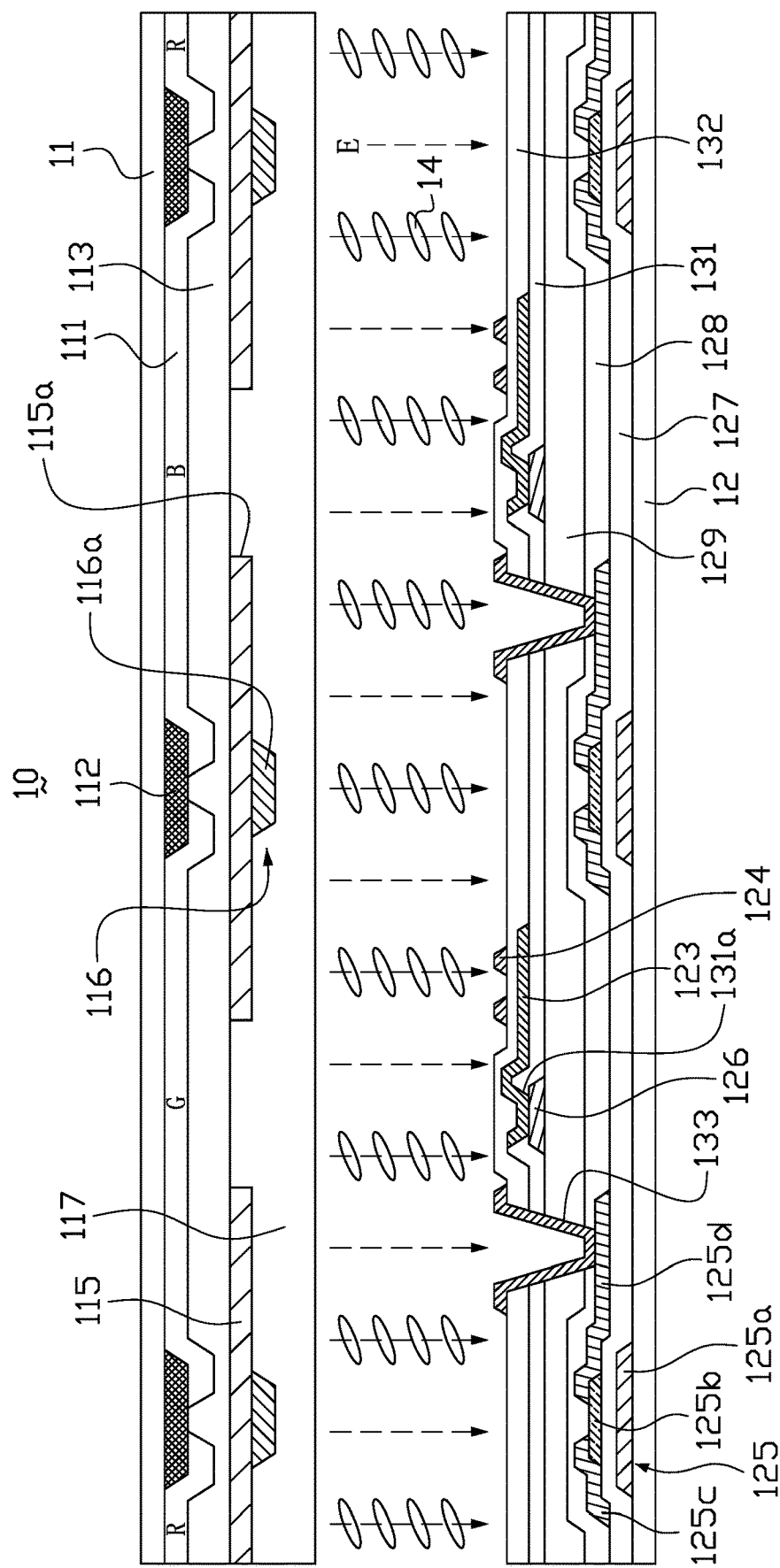
FIG. 7 is a schematic view of the touch display panel of FIG. 3 in a narrow viewing angle mode.

FIG. 7 is a schematic view of the touch display panel of FIG. 3 in a narrow viewing angle mode. Referring to FIG. 7, during the display period T1, when the voltage difference between the voltage applied to the viewing angle control electrode 115 and the direct current common voltage (DC Vcom) applied to the common electrode 123 is greater than a predetermined value (e.g., the voltage difference is greater than 3V), a strong vertical electric field E is formed between the two substrates 11, 12 (as indicated by the arrows in FIG. 7) due to a large bias voltage between the viewing angle control electrode 115 and the common electrode 123. Since the positive liquid crystal molecules will deflect towards a direction parallel to the electric field lines under an electric field, the positive liquid crystal molecules will be deflected under the action of the vertical electric field E, the tilt angle between the liquid crystal molecules and the substrates 11 and 12 is increased, and the liquid crystal molecules change from the lying posture to a tilting posture, so that the display panel has a light leakage when viewed from a large angle, and accordingly the display panel has a reduced contrast at the large angle, to cause the touch display panel 10 to finally achieve a narrow viewing angle display. Thus, the touch display panel 10 is in a narrow viewing angle mode.

Figure 8:
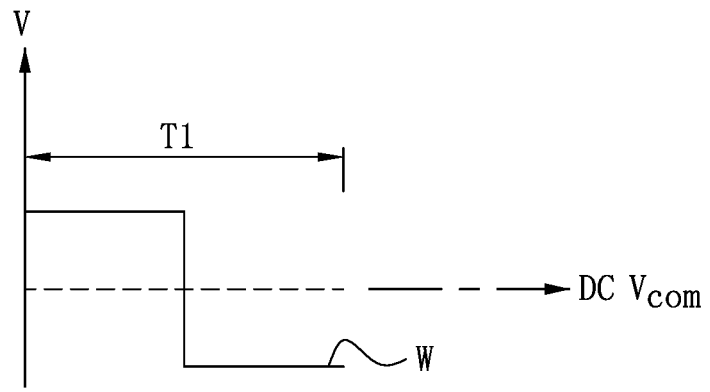
FIG. 8 is a schematic view of a waveform applied to the viewing angle control electrode in the narrow viewing angle mode shown in FIG. 7.

FIG. 8 is a schematic view of a waveform applied to the viewing angle control electrode in the narrow viewing angle mode shown in FIG. 7. Referring to FIG. 7 and FIG. 8, in the narrow viewing angle mode, the voltage applied to the viewing angle control electrode 115 during the display period T1 is preferably an alternating voltage (as shown by the curve W in FIG. 8), and the alternating voltage fluctuates around the direct current common voltage (DC Vcom) of the common electrode 123, so that the direction of the generated vertical electric field E between the first substrate 11 and the second substrate 12 changes constantly, to avoid the direction of the vertical electric field to be always in the same direction, thereby avoiding polarization of the liquid crystal molecules in the liquid crystal layer 14. Moreover, in the narrow viewing angle mode, the alternating voltage applied to the viewing angle control electrode 115 during the display period T1 may be a square wave, a sine wave, a triangular wave, or the like (the square wave is taken as an example in FIG. 8).

That is, in this embodiment, when the touch display panel 10 needs to be switched to the wide viewing angle mode, a direct current voltage may be applied to the viewing angle control electrode 115 during the display period T1, such that the voltage difference between the viewing angle control electrode 115 and the common electrode 123 is less than a predetermined value. When the touch display panel 10 needs to be switched to the narrow viewing angle mode, an alternating voltage may be applied to the viewing angle control electrode 115 during the display period T1, such that the voltage difference between the viewing angle control electrode 115 and the common electrodes 123 is greater than a predetermined value.

As shown in FIG. 6, in the touch period T2, each electrode block 123a of the common electrode 123 is used to apply a touch sensing signal, and the touch sensing signal is indicated by a dense square wave in the figure. During the touch period T2, when a human body touches the screen, the electric field of the human body acts on the sensing capacitor, and the capacitance of the sensing capacitor changes, so that the touch position can be determined according to the capacitance change.

In the touch display panel 10 of this embodiment, the common electrode 123 adopts a time multiplexing manner, so that the image display and the touch sensing are alternately performed. By controlling the voltage applied to the viewing angle control electrode 115, the touch display panel 10 can be freely switched between the wide viewing angle mode and the narrow viewing angle mode, with the function of switching between wide and narrow viewing angles and the function of in-cell touch being combined to realize touch sensing while achieving the switching between wide and narrow viewing angles. Furthermore, it also simplifies the production process, reduces the production cost, and reduces the module thickness.

Figure 9A:
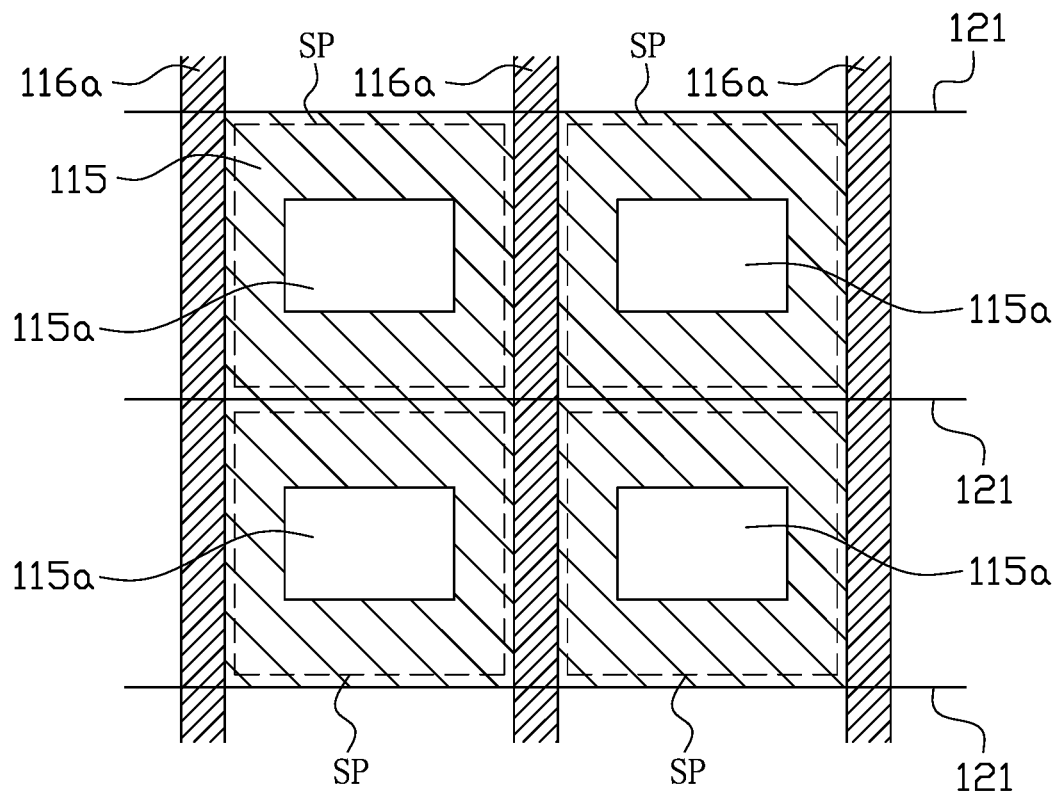
FIG. 9a to FIG. 9c are schematic planar views of different structures between the viewing angle control electrode and the metal conductive layer of FIG. 3.
Figure 9B:
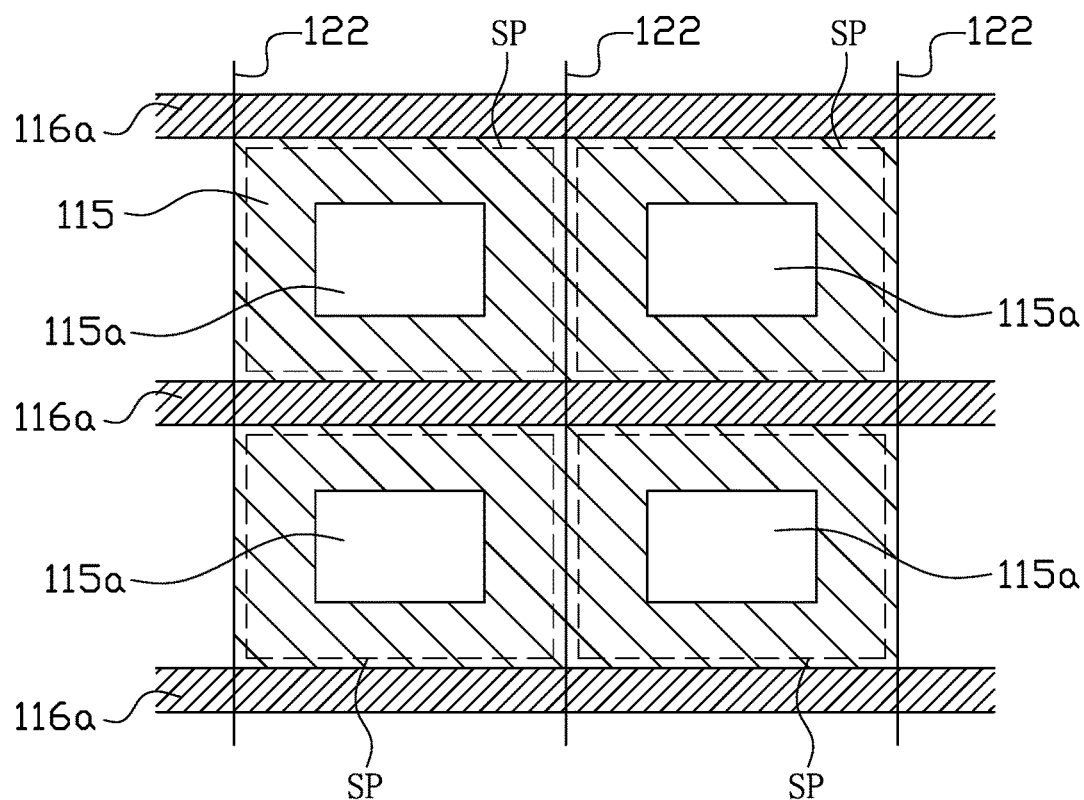
Figure 9C:
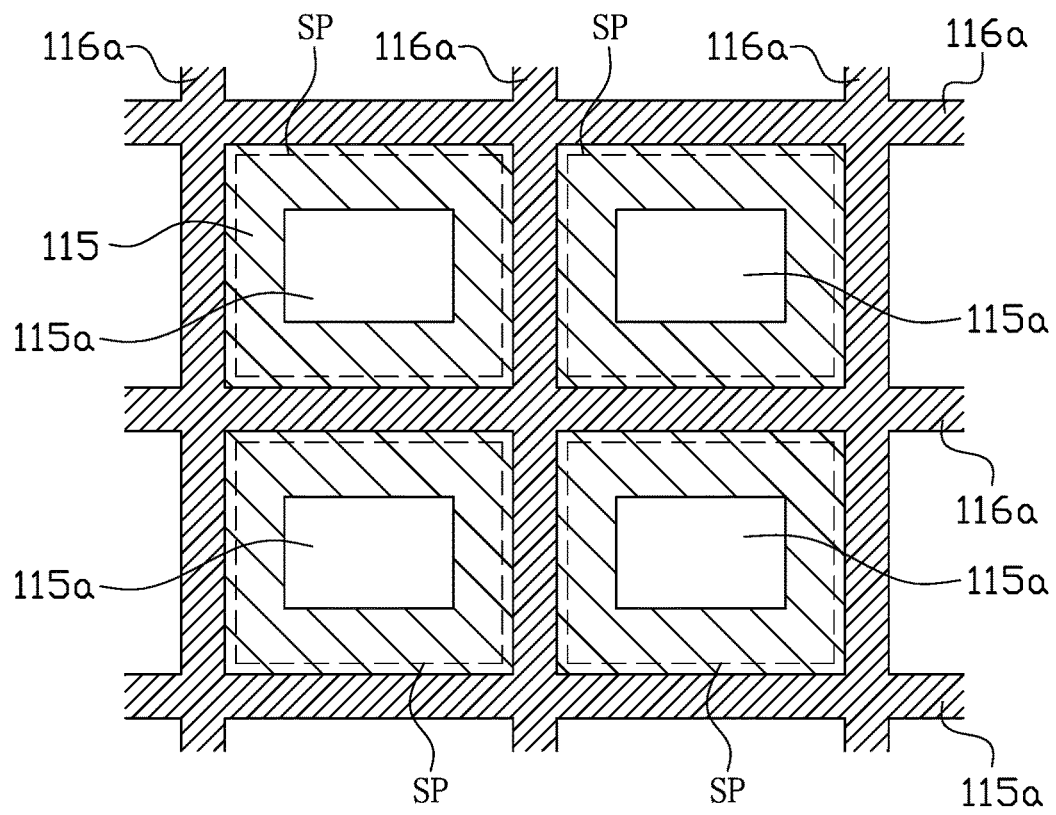

In this embodiment, the in-cell touch sensors composed of the common electrode 123 and the sensing circuit layer 126 are disposed on the second substrate 12 and located far away from the display screen on the side of the first substrate 11, and the first substrate 11 is further covered by the viewing angle control electrode 115, the viewing angle control electrode 115 may shield the touch signal, easily causing the touch sensors to be insensitive to the sensing of the touch signals. In order to increase the sensitivity of the touch sensing, as shown in FIG. 9a to FIG. 9c, the viewing angle control electrode 115 is defined with a perforation 115a in each sub-pixel SP, that is, the viewing angle control electrode 115 is removed a portion in each sub-pixel SP, in order to facilitate the touch sensors to sense changes of the touch signals. By removing a portion of the viewing angle control electrode 115, when the hand touches the screen, the capacitance change on the touch sensors occurs more easily. When the capacitance change is detected by the touch-integrated driver IC 20, the contact position can be calculated, and the sensitivity of touch sensing is effectively increased. Considering that the metal conductive strips 116a are disposed on the viewing control electrode 115 at a peripheral area corresponding to each of the sub-pixels SP, it is preferable that the position of the perforation 115a corresponds to the middle of each of the sub-pixels SP. The size of the perforation 115a can be set according to the required conductivity of the viewing angle control electrode 115 and the required sensitivity for touch sensing.

The common electrode 123, the pixel electrode 124 and the viewing angle control electrode 115 may be made of a transparent conductive material such as indium tin oxide (ITO). When the viewing angle control electrode 115 is made of a material such as ITO, the resistance loading of the viewing angle control electrode 115 is large due to the large resistance of ITO, which may easily cause signal delay. In this embodiment, the first substrate 11 is further provided with a metal conductive layer 116 electrically connected to the viewing angle control electrode 115. The metal conductive layer 116 may be made of a metal having a low resistivity such as Mo, Al, Au, Ag, or Cu. The metal conductive layer 116 includes a plurality of metal conductive strips 116a, the metal conductive strips 116a are aligned and overlapped with the black matrix 112, and the metal conductive strips 116a are electrically connected to the viewing angle control electrode 115.

By providing the metal conductive layer 116 on the first substrate 11, since the metal conductive strips 116a of the metal conductive layer 116 are distributed throughout the display panel and electrically connected to the viewing angle control electrode 115, the metal conductive strips 116a having small resistance and good conductivity may serve as an auxiliary conductive member for the viewing angle control electrode 115, thereby reducing the overall resistance of the viewing angle control electrode 115 and solving the problem of signal delay on the viewing angle control electrode 115.

In addition, since the metal conductive strips 116a are overlapped with the black matrix 112, the metal conductive strips 116a are covered by the black matrix 112. Although the metal conductive strips 116a are made of metal and are opaque, they are covered by the black matrix 112, the aperture ratio and the transmittance of each sub-pixel SP are not affected by these metal conductive strips 116a.

Referring to FIG. 9a, the metal conductive strips 116a may extend along the direction in which the data lines 122 extend. Preferably, the metal conductive strips 116a have the same number as the data lines 122, that is, each of the metal conductive strips 116a corresponds to one of the data lines 122.

Referring to FIG. 9b, the metal conductive strips 116a may also extend along the direction in which the scanning lines 121 extend. Preferably, the metal conductive strips 116a have the same number as the scanning lines 121, that is, each of the metal conductive strips 116a corresponds to one of the scanning lines 121.

Referring to FIG. 9c, the metal conductive strips 116a may also extend along the direction in which the data lines 122 and the scanning lines 121 extend, that is, the metal conductive strips 116a are intersected with each other to form a mesh structure, and the mesh structure formed by the intersection of the metal conductive strips 116a has the same pattern as the black matrix 112.

In order to apply a voltage to the viewing angle control electrode 115 on the first substrate 11, the viewing angle control electrode 115 may be electrically conducted from the first substrate 11 to the second substrate 12 through a conductive paste (not shown) in the peripheral non-display area of the display panel. A voltage is supplied from the touch-integrated driver IC 20 to the second substrate 12, and then the voltage is applied to the viewing angle control electrode 115 of the first substrate 11 from the second substrate 12 through the conductive paste.

Second Embodiment

Figure 10:
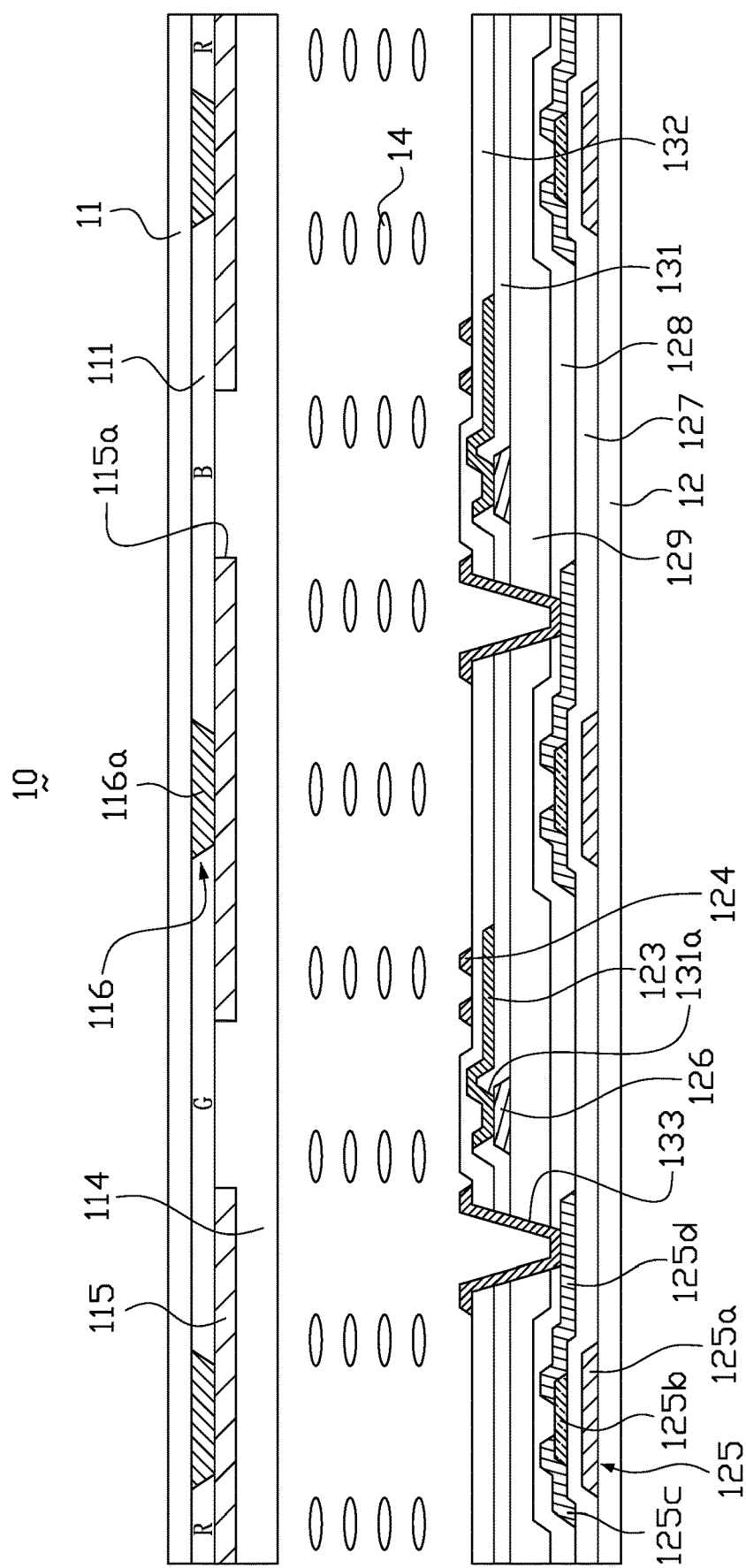
FIG. 10 is a schematic view of a touch display panel according to a second embodiment of the present invention.

FIG. 10 is a schematic view of a touch display panel according to a second embodiment of the present invention. As shown in FIG. 10, the first substrate 11 is provided with a color filter layer 111, a metal conductive layer 116, a viewing angle control electrode 115 and an overcoat layer 114. The metal conductive layer 116 includes a plurality of metal conductive strips 116a. The metal conductive strips 116a are electrically connected to the viewing angle control electrode 115. This embodiment differs from the foregoing first embodiment in that the metal conductive strips 116a of the metal conductive layer 116 are intersected with each other to form a mesh structure and also serve as the black matrix (BM), thereby eliminating the original black matrix 112, which is advantageous for simplifying the production process and reducing the production cost. In this embodiment, the color filter layer 111 and the metal conductive layer 116 are formed on the surface of the first substrate 11 facing the liquid crystal layer 14, the viewing angle control electrode 115 covers the color filter layer 111 and the metal conductive layer 116, and the overcoat layer 114 covers the viewing angle control electrode 115.

For other structures of this embodiment, reference may be made to the foregoing first embodiment, and details are not described herein again.

Third Embodiment

Figure 11:
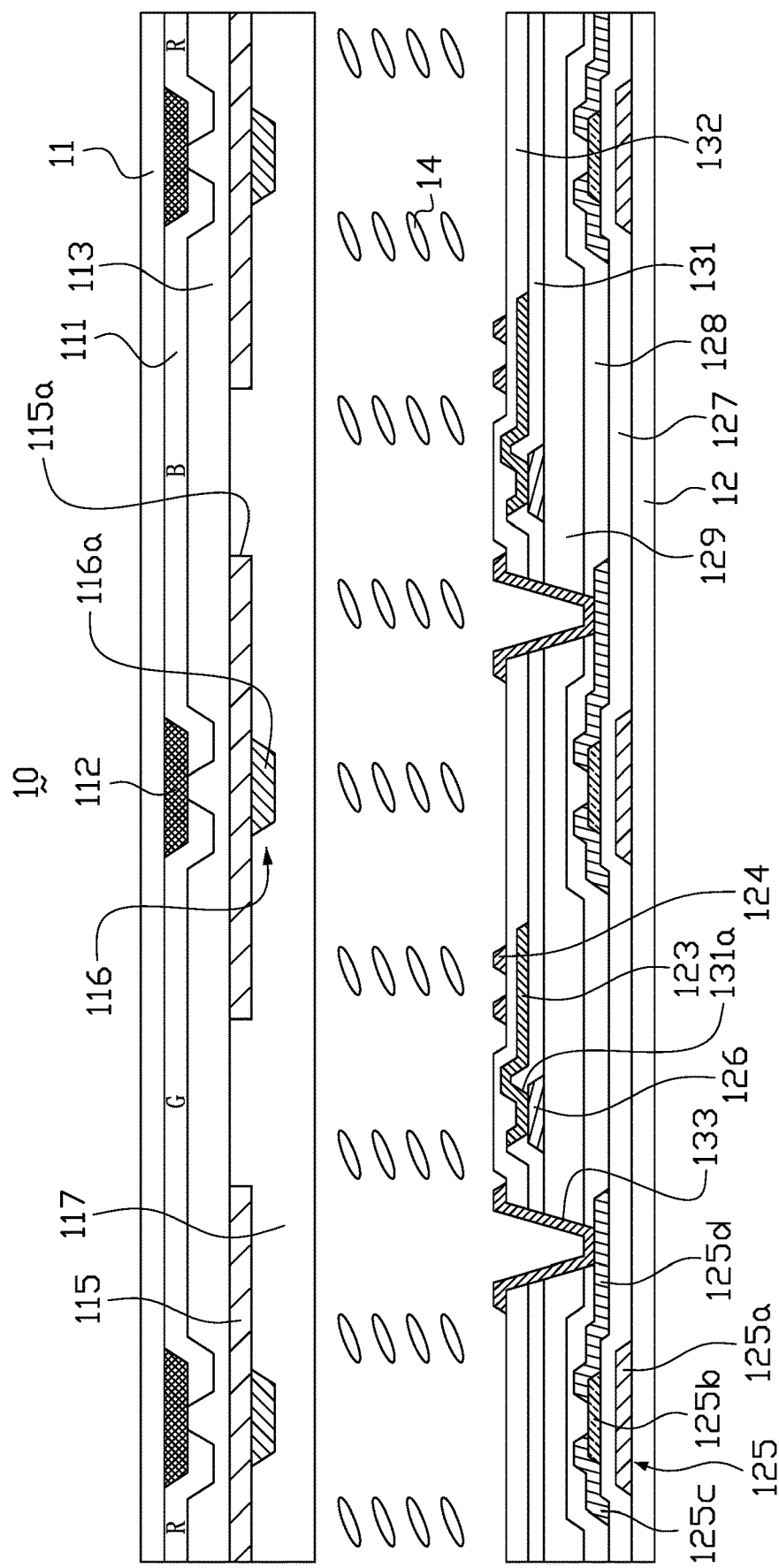
FIG. 11 is a schematic view of a touch display panel in a narrow viewing angle mode according to a third embodiment of the present invention.
Figure 12:
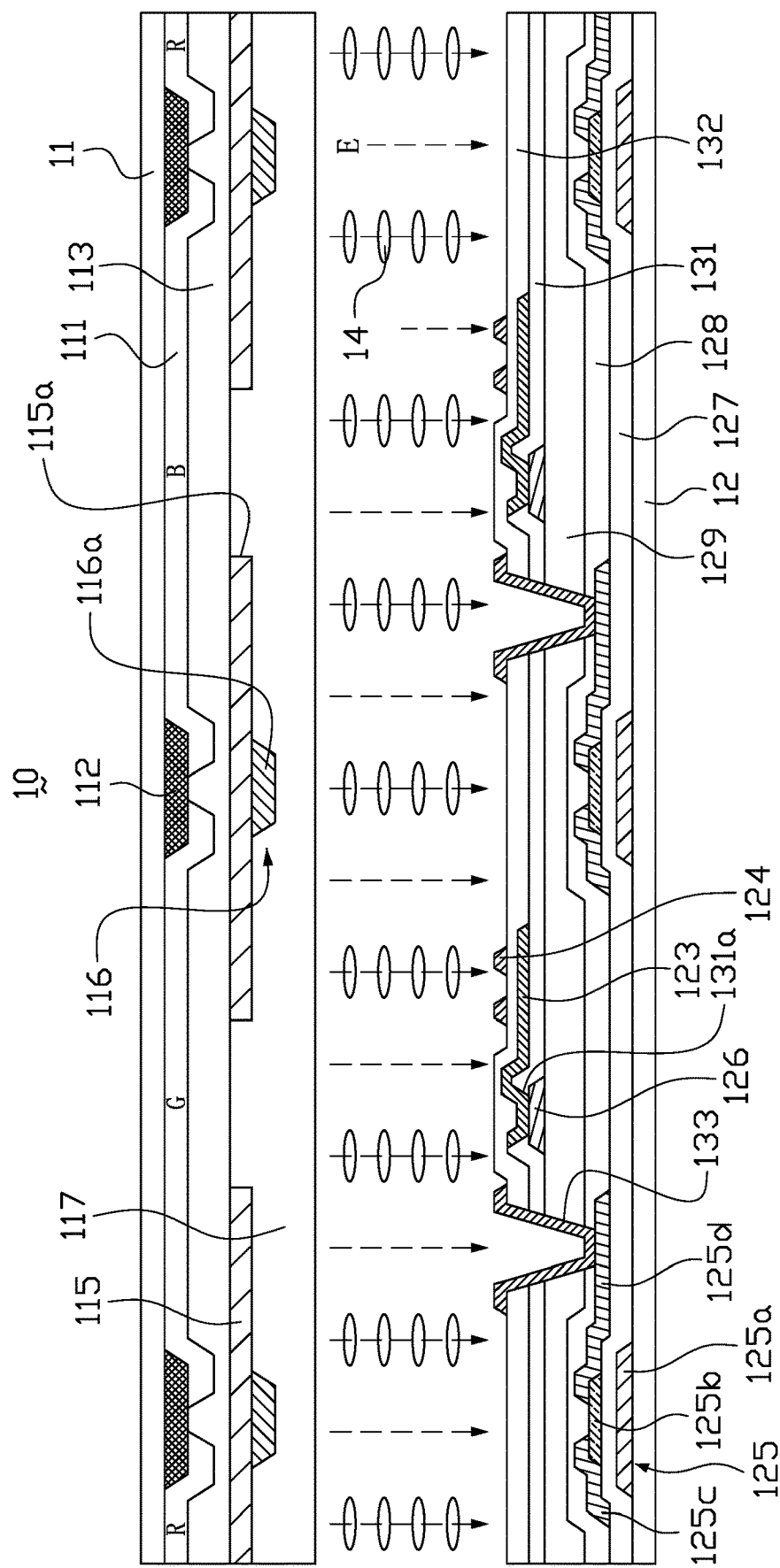
FIG. 12 is a schematic view of the touch display panel of FIG. 11 in a wide viewing angle mode.

FIG. 11 is a schematic view of a touch display panel in a narrow viewing angle mode according to a third embodiment of the present invention. FIG. 12 is a schematic view of the touch display panel of FIG. 11 in a wide viewing angle mode. Referring to FIG. 11 and FIG. 12, this embodiment differs from the foregoing first embodiment in that the liquid crystal layer 14 in this embodiment employs negative liquid crystal molecules. With the advancement of technology, the performance of negative liquid crystals is significantly improved, and applications have become more widespread. In this embodiment, as shown in FIG. 11, in the initial state (i.e., no voltage is applied to the display panel), the negative liquid crystal molecules in the liquid crystal layer 14 have an initial pretilt angle with respect to the substrates 11, 12, that is, the negative liquid crystal molecules are in a tilting posture with respect to the substrates 11, 12 in the initial state.

Referring to FIG. 11, during the display period T1, when the voltage difference between the voltage applied to the viewing angle control electrode 115 and the direct current common voltage (DC Vcom) applied to the common electrode 123 is less than a predetermined value (e.g., the voltage difference is less than 1V), the tilt angle of the liquid crystal molecules in the liquid crystal layer 14 is almost unchanged and remains in the tilting posture due to a small bias voltage between the viewing angle control electrode 115 and the common electrode 123, so that the display panel has a light leakage when viewed from a large angle, and accordingly the display panel has a reduced contrast at the large angle, causing the touch display panel 10 to be in a narrow viewing angle mode.

In this embodiment, in the narrow viewing angle mode, the voltage applied to the viewing angle control electrode 115 during the display period T1 is preferably a direct current voltage, and the direct current voltage is preferably equal to the direct current common voltage (DC Vcom) applied to the common electrode 123, such that the voltage difference between the viewing angle control electrode 115 and the common electrode 123 is zero, to thereby realize the narrow viewing angle display.

Referring to FIG. 12, during the display period T1, when the voltage difference between the voltage applied to the viewing angle control electrode 115 and the direct current common voltage (DC Vcom) applied to the common electrode 123 is greater than a predetermined value (e.g., the voltage difference is greater than 3V), a strong vertical electric field E is formed between the two substrates 11, 12 (as indicated by the arrows in FIG. 12) due to a large bias voltage between the viewing angle control electrode 115 and the common electrode 123. Since the negative liquid crystal molecules will deflect towards a direction perpendicular to the electric field lines under an electric field, the positive liquid crystal molecules will be deflected under the action of the vertical electric field E, the tilt angle between the liquid crystal molecules and the substrates 11 and 12 is reduced. When the tilt angle of the liquid crystal molecules is reduced to a lying posture substantially parallel to the substrates 11, 12, the light leakage phenomenon is correspondingly reduced at large angle of the display panel, the contrast of the display panel at the large angle is increased, and the viewing angle is increased accordingly, causing the touch display panel 10 to be in a wide viewing angle mode.

In this embodiment, in the wide viewing angle mode, the voltage applied to the viewing angle control electrode 115 during the display period T1 is preferably an alternating voltage (as shown by the curve W in FIG. 8), and the alternating voltage fluctuates around the direct current common voltage (DC Vcom) of the common electrode 123.

For other structures of this embodiment, reference may be made to the foregoing first embodiment, and details are not described herein again.

Fourth Embodiment

Figure 13A:
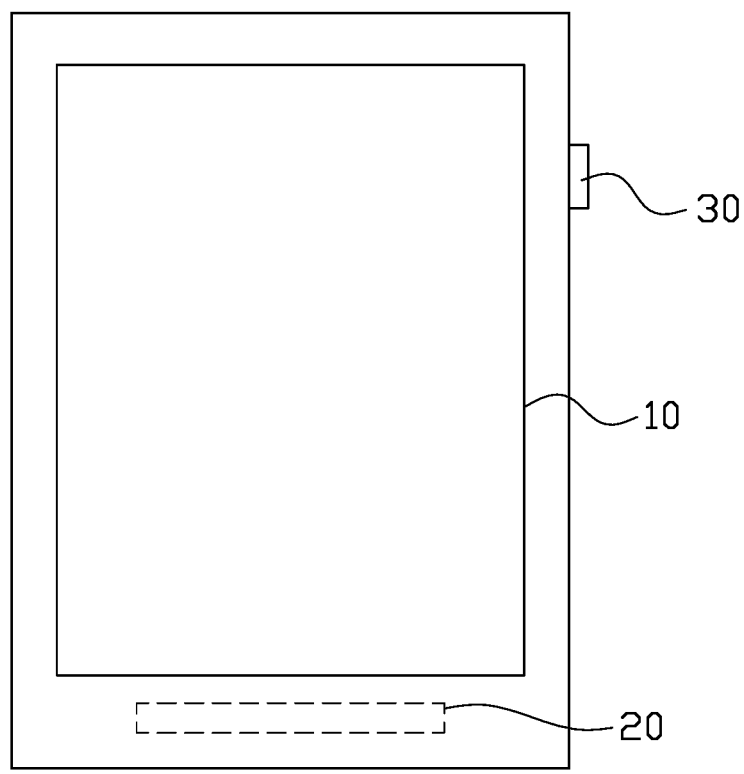
FIG. 13a to FIG. 13b are schematic planar views of a touch display device according to a fourth embodiment of the present invention.
Figure 13B:
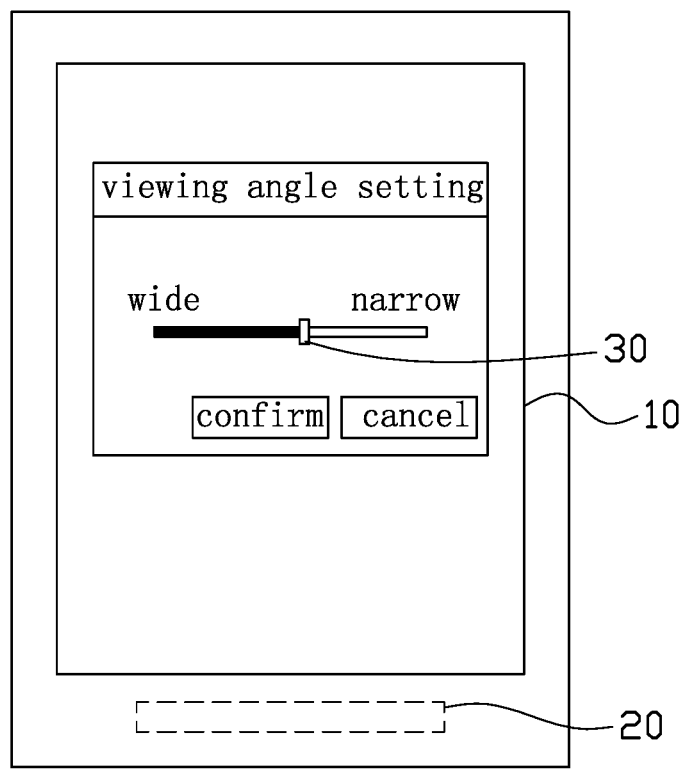

FIG. 13a to FIG. 13b are schematic planar views of a touch display device according to a fourth embodiment of the present invention. Referring to FIG. 13a and FIG. 13b, the present invention further provides a touch display device with switchable view angle, including:

the above-described viewing angle switchable touch display panel 10;

the touch-integrated driver IC 20 configured to drive the touch display panel 10, to realize image display during the display period T1 and realize touch sensing during the touch period T2.

Further, the liquid crystal display device is provided with a viewing angle switching button 30 for the user to issue a viewing angle switching request to the touch display device. The viewing angle switching button 30 may be a physical button (as shown in FIG. 13a), so that the viewing angle switching button 30 can be disposed on the outer casing of the touch display device, and the user can issue a viewing angle switching request to the touch display device by pressing it. Also, the viewing angle switching button 30 may be a software control or an application (APP) to implement the switching function (such as setting a wide viewing angle or a narrow viewing angle by touching a slider bar 30 as shown in FIG. 13b).

Taking the touch display panel 10 shown in the first embodiment as an example, under normal circumstances, the touch-integrated driver IC 20 applies a direct current voltage which is the same as the direct current common voltage (DC Vcom) to the viewing angle control electrode 115 during the display period T1, and the touch display panel 10 is in a wide viewing angle mode. When there is a need to be switched to a narrow viewing angle mode for protection of privacy, the user can issue a viewing angle switching request by operating the viewing angle switching button 30. Upon receiving the viewing angle switching request for switching to the narrow viewing angle mode, the touch-integrated driver IC 20 applies an alternating voltage of a large amplitude to the viewing angle control electrode 115 during the display period T1, such that a large voltage difference exists between the viewing angle control electrode 115 and the common electrode 123, and a strong vertical electric field E is generated between the first substrate 11 and the second substrate 12, to drive the liquid crystal molecules to deflect from the lying posture to the tilting posture and cause the touch display panel 10 to switch from the wide viewing angle mode to the narrow viewing angle mode. When the narrow viewing angle mode is not required, the user can operate the viewing angle switching button 30 again, the touch-integrated driver IC 20 cancels the alternating voltage applied to the viewing angle control electrode 115, and applies the direct current voltage which is the same as the direct current common voltage (DC Vcom) to the viewing angle control electrode 115 again, to return back to the wide viewing angle mode. Therefore, by providing the viewing angle switching button 30, the touch display device has good operational flexibility and convenience.

The above are only the preferred embodiments of the present invention, and are not intended to limit the present invention. Any modifications, equivalents, improvements, etc., which are within the spirit and scope of the present invention, should be included in the scope of the present invention.

INDUSTRIAL APPLICABILITY

In the embodiments of the present invention, the common electrode adopts a time multiplexing manner, so that the image display and the touch sensing are alternately performed. By controlling the voltage applied to the viewing angle control electrode, the touch display panel can be freely switched between the wide viewing angle mode and the narrow viewing angle mode, with the function of switching between wide and narrow viewing angles and the function of in-cell touch being combined to realize touch sensing while achieving the switching between wide and narrow viewing angles. Furthermore, it also simplifies the production process, reduces the production cost, and reduces the module thickness.

What is claimed is:

1. A touch display panel with switchable viewing angles, comprising a first substrate, a second substrate disposed opposite to the first substrate, and a liquid crystal layer disposed between the first substrate and the second substrate, the first substrate being provided with a viewing angle control electrode, the second substrate being provided with a plurality of scanning lines, a plurality of data lines, a common electrode and pixel electrodes, the plurality of scanning lines and the plurality of data lines being insulated from and intersected with each other to define a plurality of sub-pixels, a pixel electrode being disposed in each of the sub-pixels, wherein the common electrode comprises a plurality of electrode blocks arranged in an array and insulated from each other, the second substrate is further provided with a sensing circuit layer, the sensing circuit layer comprises a plurality of sensing lines insulated from each other, the sensing lines are electrically connected to the electrode blocks in a one-to-one correspondence, respectively, each frame of the display panel is divided into a display period and a touch period, the electrode blocks of the common electrode are used for image display during the display period, and the electrode blocks of the common electrode are used for touch sensing during the touch period; wherein the second substrate further comprises a plurality of thin film transistors, the thin film transistors are covered by a first passivation layer, the sensing circuit layer and the common electrode are disposed above the first passivation layer, a second passivation layer is disposed between the sensing circuit layer and the common electrode, the second passivation layer is defined with a contacting hole at a position corresponding to each of the electrode blocks of the common electrode, one end of each sensing line of the sensing circuit layer is electrically connected to a corresponding electrode block of the common electrode through a contacting hole, another end of each sensing line of the sensing circuit layer is electrically connected to a touch-integrated driver IC.

2. The touch display panel with switchable viewing angles according to claim 1, wherein the viewing angle control electrode is defined with a perforation in each of the sub-pixels.

3. The touch display panel with switchable viewing angles according to claim 2, wherein the position of the perforation corresponds to a middle of each of the sub-pixels.

4. The touch display panel with switchable viewing angles according to claim 1, wherein the first substrate further comprises a color filter layer, a black matrix and a metal conductive layer, the metal conductive layer comprises a plurality of metal conductive strips, the metal conductive strips are aligned and overlapped with the black matrix, and the metal conductive strips are electrically connected to the viewing angle control electrode.

5. The touch display panel with switchable viewing angles according to claim 4, wherein the first substrate further comprises a first overcoat layer and a second overcoat layer, the color filter layer and the black matrix are formed on a surface of the first substrate facing the liquid crystal layer, the first overcoat layer covers the color filter layer and the black matrix, the viewing angle control electrode is formed on the first overcoat layer, the metal conductive layer is formed on the viewing angle control electrode, and the second overcoat layer covers the metal conductive layer.

6. The touch display panel with switchable viewing angles according to claim 1, wherein the first substrate further comprises a color filter layer and a metal conductive layer, the metal conductive layer comprises a plurality of metal conductive strips, the metal conductive strips are intersected with each other to form a mesh structure and also serve as a black matrix, the metal conductive strips are electrically connected to the viewing angle control electrode.

7. The touch display panel with switchable viewing angles according to claim 6, wherein the first substrate further comprises an overcoat layer, the color filter layer and the metal conductive layer are formed on a surface of the first substrate facing the liquid crystal layer, the viewing angle control electrode covers the color filter layer and the metal conductive layer, and the overcoat layer covers the viewing angle control electrode.

8. The touch display panel with switchable viewing angles according to claim 1, wherein each electrode block of the common electrode corresponds to one or multiple sub-pixels.

9. The touch display panel with switchable viewing angles according to claim 1, wherein the second substrate further comprises an overcoat layer, the overcoat layer is formed on the first passivation layer, the sensing circuit layer is formed on the overcoat layer, and the second passivation layer covers the sensing circuit layer.

10. The touch display panel with switchable viewing angles according to claim 1, wherein the pixel electrode is located above the common electrode, and a third passivation layer is provided between the pixel electrode and the common electrode.

11. The touch display panel with switchable viewing angles according to claim 1, wherein each electrode block of the common electrode is applied with a direct current voltage during the display period, each electrode block of the common electrode is applied with a touch sensing signal during the touch period.

12. The touch display panel with switchable viewing angles according to claim 11, wherein during the display period, when a voltage difference between the viewing angle control electrode and the common electrode is less than a predetermined value, the touch display panel is in a first viewing angle mode, and when a voltage difference between the viewing angle control electrode and the common electrode is greater than a predetermined value, the touch display panel is in a second viewing angle mode.

13. The touch display panel with switchable viewing angles according to claim 12, wherein when the touch display panel is in the first viewing angle mode, the viewing angle control electrode is applied with a direct current voltage during the display period, and when the touch display panel is in the second viewing angle mode, the viewing angle control electrode is applied with an alternating voltage during the display period.

14. The touch display panel with switchable viewing angles according to claim 12, wherein the liquid crystal layer employs positive liquid crystal molecules, the first viewing angle mode is a wide viewing angle mode, and the second viewing angle mode is a narrow viewing angle mode.

15. The touch display panel with switchable viewing angles according to claim 12, wherein the liquid crystal layer employs negative liquid crystal molecules, the first viewing angle mode is a narrow viewing angle mode, and the second viewing angle mode is a wide viewing angle mode.

16. A touch display device with switching viewing angles, comprising:
   the viewing angle switchable touch display panel according to claim 1; and
   a touch-integrated driver IC configured to drive the touch display panel, to realize image display during the display period and realize touch sensing during the touch period.

17. The touch display device with switching viewing angles according to claim 16, wherein the touch display device is provided with a viewing angle switching button for a user to issue a viewing angle switching request to the touch display device.

* * * * *